United States Patent Office 3,037,029
Patented May 29, 1962

3,037,029
IMIDAZOLINE COMPOUNDS
Clarence F. Huber, Mount Healthy, and Paul F. Thompson, Deer Park, Ohio, assignors to The Cincinnati Milling Machine Company, Cincinnati, Ohio, a corporation of Ohio
No Drawing. Original application Mar. 6, 1957, Ser. No. 644,212, now Patent No. 2,950,211, dated Aug. 23, 1960. Divided and this application Nov. 30, 1959, Ser. No. 859,832
4 Claims. (Cl. 260—309.6)

This invention relates to bituminous compositions of the type that are mixed with mineral aggregates in the construction of asphalt pavements. More particularly the invention relates to a novel group of thermally stable bond-improving agents that are adapted to be incorporated in such bituminous compositions to improve the effectiveness of the bond between the bituminous composition and the aggregate, especially when the aggregate is wet at the time the bitumen is applied thereto. The invention also relates to bituminous compositions incorporating such bond-improving agents.

It has long been recognized that in the construction of asphalt pavements water has a detrimental effect on the strength of the bond between the asphalt and mineral aggregate. If the aggregate is wet at the time of application of the asphalt, coating of the aggregate by the asphalt is incomplete; and if the coated aggregate is exposed to water shortly after it is coated, separation of the asphalt from the aggregate tends to occur.

To overcome this problem, it has previously been proposed that certain chemical bond-improving agents, sometimes called "additives," be incorporated in the asphalt to improve its adherence to wet aggregates. The nature of the chemical additives used has varied somewhat depending upon the mode of application of the asphalt to the aggregate. Broadly speaking, asphalt is used in road construction in two different ways which can conveniently be designated as the "cold mix" and "hot mix" processes. In the former method the asphalt is "cut back," that is, mixed with a suitable solvent to render it sufficiently fluid for cold application to the aggregate; whereas in the latter method, the asphalt is heated to a temperature at which it is sufficiently fluid for ready mixing with and coating of the aggregate.

Typical bond-improving additives that have been used in the cold mix process are for example fatty acid amides of primary polyamines and their soaps, e.g. those disclosed in Johnson Patent 2,426,220. However, while such compounds provide a significant advantage when used in a cold mix composition, they are unstable thermally and lose their effectiveness when heated in asphalt in accordance with the usual hot mix procedure. In cases where the asphalt is to be heated prior to its application to the aggregate thermally stable additives are required. Additives of this type are disclosed in Jelling Patents 2,663,648 and 2,737,509.

As indicated above, the present invention is concerned with a novel group of compounds that are thermally stable and hence especially useful in hot mix asphalt compositions. It is an object of the present invention to provide a group of thermally stable asphalt additives that are adapted to be incorporated in bituminous compositions to give an improved bond when the asphalt is applied to wet aggregates, and improved adherence of the asphalt to the aggregates when the paving composition is exposed to water. It is another object of the invention to provide a novel group of thermally stable asphalt additives which can be incorporated in asphalt to provide a given degree of bonding effectiveness at a significantly lower concentration than is required when using the previously known additives. It is still another object of the invention to provide thermally stable asphalt additives of improved effectiveness that can be easily made from inexpensive readily available raw materials. It is still another object of the invention to provide an asphalt composition having improved bonding effectiveness when applied hot to an aggregate. Other objects of the invention will be in part obvious and in part pointed out hereafter.

Applicants have found that the effectiveness of certain fatty acid amides as asphalt additives can be substantially increased by introducing into the hydrocarbon chain of the fatty acid at least one substituent group that is connected to the hydrocarbon chain through a nitrogen atom. It has been found that the introduction of such a nitrogen-linked substituent into the fatty acid hydrocarbon chain gives an improved asphalt additive irrespective of the nature of the amide-forming amine used in preparing the fatty acid amide. More particularly, it is known that fatty acid amides made from different amines vary substantially in their effectiveness, but for any given fatty acid amide a significant improvement in effectiveness is exhibited when a nitrogen linked substituent is introduced into the fatty acid chain in accordance with the present invention.

The term fatty acid is used herein in its broad sense to comprehend aliphatic monocarboxylic acids including not only the acids commonly derived from fats and oils but also the lower members of the series such as acetic and propionic acids.

The compounds of the present invention may be represented by the general formula:

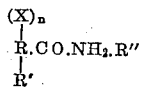

wherein R is selected from alkyl and alkenyl groups having 1 to 20 carbon atoms; R' is selected from alkyl-amino, dialkylamino, alkylaminoalkyleneamino, dialkylamino-alkyleneamino, 2 alkyl-1,2-imidazolinyl, 2 alkenyl-1,2-imidazolinyl, N-1 (2-alkyl-2-imidazolinyl) alkyleneamino, and N-1 (2-alkenyl-2-imidazolinyl) alkyleneamino groups; R" is selected from 2-alkyl-2-imidazolinylalkylene, 2-alkenyl-2-imidazolinyl-alkylene, alkylaminoalkylene, and dialkylaminoalkylene groups; X is halogen; and $n$ is selected from zero and the positive integers.

Introduction of the nitrogen-linked substituent into the fatty acid chain can be effected in any of several ways. For example, an unsaturated fatty acid may be chlorinated at the double bond and the chlorinated fatty acid then reacted with a suitable amine or imidazoline to effect a condensation with the elimination of hydrogen chloride. Alternatively a saturated fatty acid can be chlorinated and then reacted with an amine or imidazoline. Usually the former procedure is preferable since it permits more accurate location of the substituent along the fatty acid chain.

Either before or after the proper substituent has been introduced into the hydrocarbon chain of the fatty acid, the carboxyl group of the acid is reacted with an amine or imidazoline which may be the same as or different from the substituent on the hydrocarbon chain to form an amide. The general nature of the reactions involved in making the present products can be conveniently illustrated in the following equations which are written in terms of the procedure and product described in Example 1 below:

(1)
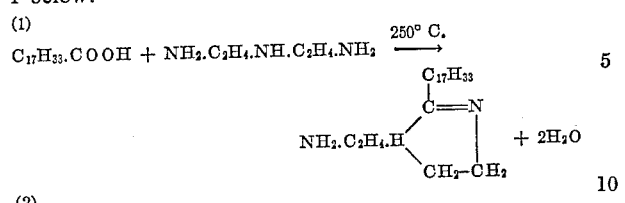

(2)
$CH_3.(CH_2)_7.CH=CH(CH_2)_7COOH + Cl_2 \longrightarrow$
$CH_3(CH_2)_7CHCl.CHCl(CH_2)_7COOH$ Reacting equi-molar quantities of products 1 and 2 gives:

(3)
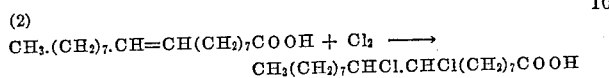

Reacting a second mol of product 1 with product 3 gives:

(4)
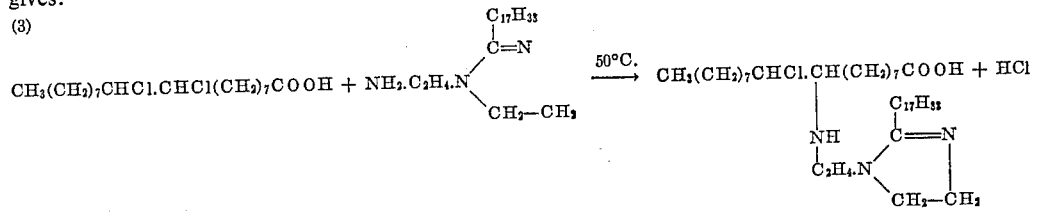

The hydrochloric acid formed in step 3 of the above reaction combines with the reaction product to form a salt. It has been found that the presence of this HCl in salt form does not adversely affect the properties of the final asphalt additive and that the HCl can be removed from or left in the compounds of the present invention as desired.

As indicated above a rather wide variety of substituted and unsubstituted amines and imidazolines can be used both for the halide substitution on the fatty acid chain and for reaction with the carboxyl group of the fatty acid. Examples of amines and imidazolines useful for halide substitution in accordance with the present invention are given in Table I below, and examples of amines and imidazolines useful for condensation with the carboxyl group of the fatty acid to form amides are given in Table II.

TABLE I

Monoalkyl and dialkylamines wherein the alkyl groups have from 1 to 6 carbon atoms.

$CH_3.NH.C_4H_9$—methyl butyl amine
$(CH_3)_2NCH_2CH_2CH_2NH_2$—3 - dimethylamino propylamine
$(C_2H_3)_2NCH_2CH_2CH_2NH_2$—3-diethylamino propylamine
$(C_3H_7)_2NCH_2CH_2CH_2NH_2$—3 - dipropylamino propylamine

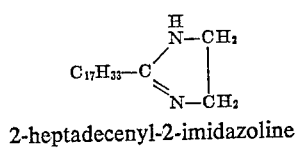

2-heptadecenyl-2-imidazoline

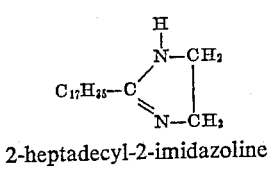

2-heptadecyl-2-imidazoline

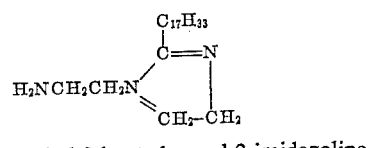

1-beta-aminoethyl-2-heptadecenyl-2-imidazoline

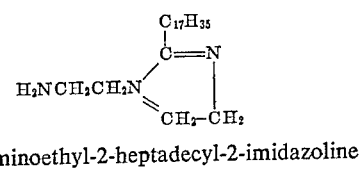

1-beta-aminoethyl-2-heptadecyl-2-imidazoline $\xrightarrow{50°C.}$ $CH_3(CH_2)_7CHCl.CH(CH_2)_7COOH + HCl$

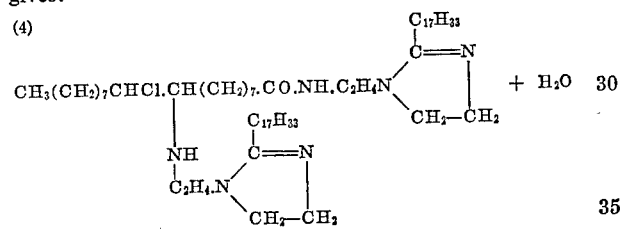

TABLE II $(CH_3)_2NCH_2CH_2CH_2NH_2$ named 3-dimethylamino propylamine
$(C_2H_3)_2NCH_2CH_2CH_2NH_2$ named 3-diethylamino propylamine
$(C_3H_7)_2NCH_2CH_2CH_2NH_2$ named 3-dipropylamino propylamine
$(CH_3)_2NCH_2CH_2NH_2$ named 2-dimethylamino ethylamine

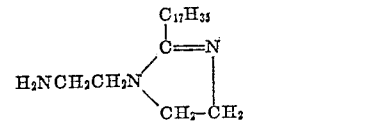

1-beta-aminoethyl-2-heptadecenyl-2-imidazoline
$H_2NCH_2CH_2NH_2$—ethylene diamine
$HN(CH_3)CH_2CH_2NH_2$—N-methyl ethylenediamine A convenient starting material for preparation of the halogenated fatty acid is an ethylenically unsaturated acid, such as oleic acid. Such materials can be readily halogenated at the double bond without using an excessive amount of halogen, and the nitrogen-linked substituent can thus be definitely located along the fatty acid chain and more particularly near the center thereof. However, a wide variety of other fatty materials may also be used. Thus the material to be halogenated may be a saturated, unsaturated or poly-unsaturated fatty acid, or it may be a commercially available mixture of such acids. Also triglycerides such as vegetable, animal and marine oils may be used as sources of the fatty acids required to carry out this reaction. As indicated above, lower members of the fatty acid series such as acetic and propionic acids may also be used.

If desired, the fatty-acid-chain-substituted amides of the present invention can be reacted with organic acids to form salts or soaps in known manner. The salt- or soap-forming acids may contain from 1–20 carbon atoms and may be saturated, unsaturated or poly-unsaturated acids or commercial mixtures of these acids, e.g. tall oil acids or naphthenic acids.

Typical compounds that come within the scope of the general formula given above include:

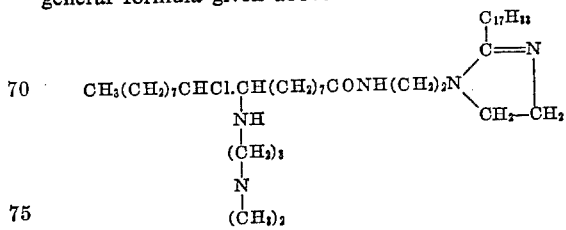

named 9-N-(3-dimethylamino propylamino)-N-2(1-(2-heptadecenyl-2-imidazolinyl))ethyl-10-chloro stearamide

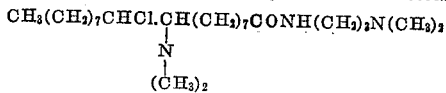

named 9-(dimethylamino)-N-(3-dimethylamino propyl)-10-chloro stearamide

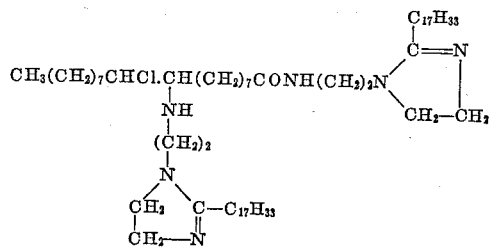

named 9-N-(1-(2-heptadecenyl-2-imidazolinyl))ethyl amino-N-2-(1-(2-heptadecenyl-2-imidazolinyl))ethyl-10-chloro stearamide

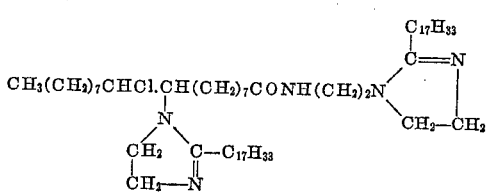

named 9-(1-(2-heptadecenyl-2-imidazolinyl))-N-2(1-(2-heptadecenyl-2-imidazolinyl))ethyl-10-chloro stearamide

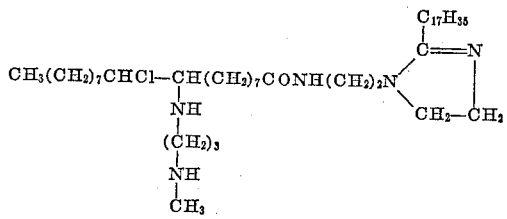

named 9-N-(3-methyl amino propylamino)-N-2(1-(2-heptadecyl-2-imidazolinyl))ethyl-10-chloro stearamide

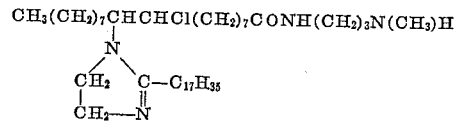

named 10-(1-(2-heptadecyl-2-imidazolinyl))-N-(3-methylamino propyl)-9-chloro stearamide

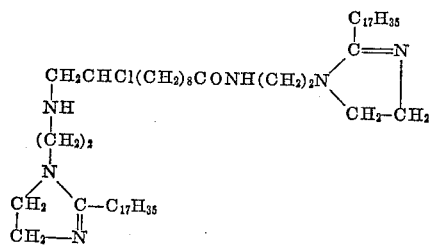

named 11-N-(1-(2-heptadecyl-2-imidazolinyl))ethylamino-N-2-(1-(2-heptadecyl-2-imidazolinyl))ethyl-10-chloro undecanamide

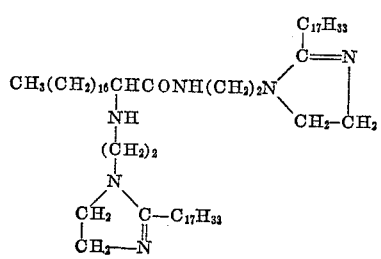

named 2-N-(1-(2-heptadecenyl-2-imidazolinyl))ethylamino-N-2-(1-(2-heptadecenyl-2-imidazolinyl))ethyl stearamide In order to point out more fully the nature of the present invention the following specific examples are given of procedures for preparing illustrative compounds according to the present invention:

*Example 1*

One mol of oleic acid was added during a four hour period to one mol of diethylene triamine held at 180–190° C. during the addition period. The temperature was then raised to 250° C. and held at that temperature for one hour to obtain a reaction product that contained largely 1-amino ethyl-2-heptadecenyl-2-imidazoline. During the course of the reaction, approximately 1.5 to 2.0 mols of water were removed by distillation.

282.5 grams (1 mol) of oleic acid were chlorinated with 70.9 grams (1 mol) of dry chlorine in one hour maintaining the chlorination temperature at 60–70° C. The 9,10-dichlorostearic acid was air-blown for two hours at 55° C. to remove residual chlorine.

To one mol of 1-amino ethyl-2-heptadecenyl-2-imidazoline, 0.5 mols of the 9,10-dichloro stearic acid was added, and the mixture was held at 150° C. for 3 hours to form 9-2(1-(2-heptadecenyl-2-imidazolinyl))ethylamino-N-2(1-(2-heptadecenyl-2-imidazolinyl))ethyl-10-chloro stearamide.

One part by weight of this product was mixed with 100 parts by weight of 85/100 penetration asphalt at a temperature of 325° F. and maintained at this temperature for seven days. At the end of this heating time, the asphalt was converted to an RC–2 cut back asphalt by dilution with petroleum naphtha. This cut back asphalt readily coated wet aggregate particles and when the coated aggregate was immersed in water, no separation of the bitumen from the aggregate occurred.

*Example 2*

One mol of 9,10-dichloro stearic acid was dissolved in 200 ml. of pyridine. Two mols of dimethylamine gas were introduced into this solution at room temperature and the reaction mixture was allowed to stand for 24–48 hours at room temperature to form 9-dimethylamino-10-chloro stearic acid. The pyridine and excess dimethylamine were then removed by distillation, after which the product was washed with water to remove pyridine hydrochloride and traces of pyridine.

After drying, one mol of 3-dimethylamino propylamine was mixed with this product and the reaction mixture heated at 150° C. for a period of four hours to form the substituted stearamide of the 3-dimethylamino propylamine. The resulting product was mixed with one mol of tall oil acids and blended therewith for 15 minutes to form a tall oil acid soap of 9-dimethylamino-N-(3-dimethylamino propyl)-10-chloro stearamide.

This product when incorporated in asphalt was similar in effectiveness and heat stability to that of Example 1.

*Example 3*

To one mol of diethylene triamine held just under reflux, one mol of oleic acid was added over a four hour period. The reaction temperature was then raised to 250° C. and held for one hour to form 1-amino ethyl-2-heptadecenyl-2-imidazoline. One mol of dry 9-dimethylamino-10-chloro stearic acid prepared as in Example 2 was mixed with the substituted imidazoline and the mixture was heated at 150° C. for four hours to form 9-dimethylamino-N-2-(1-(2-heptadecenyl-2-imidazolinyl))ethyl-10-chloro stearamide.

This product was found to be a thermally stable surface active bituminous bonding agent.

*Example 4*

One mol of 9,10-dichloro stearic acid was dissolved in 200 ml. of pyridine and one mol of n-butylamine was added thereto over a period of four hours while the mixture was held at reflux temperature to form 9-n-butylamino-10-chloro stearic acid. Excess pyridine was then removed by distillation and pyridine hydrochloride formed during the reaction was washed from the product with water, after which the product was dried.

One mol of this product was mixed with one mol of 3-dimethylamino ethylamine and the reaction mixture was heated at 150° C. for three hours to form the substituted stearamide of the amine.

This product was found to be a thermally stable bonding agent when mixed with bituminous materials and maintained at an elevated temperature.

*Example 5*

Two mols of 1-aminoethyl-2-heptadecenyl-2-imidazoline prepared as in Example 1 was mixed with one mol of chloroacetic acid and the mixture was heated at 150° C. for 3 hours to form alpha-N-(1-(2-heptadecenyl-2-imidazolinyl))ethylamino-N-2-(1-(2-heptadecenyl - 2 - imidazolinyl))ethyl acetamide. This product was found to be a thermally stable asphalt additive.

In Examples 1 to 4 given above it has been assumed that the chlorine atom in the "9" position on the stearic acid chain is the one that is substituted by the amine group. However, it will be recognized by those skilled in the art that these products are probably a mixture of two compounds, one of which is substituted at the "9" position and the other of the "10" position. More generally, in cases where fatty acids having relatively long hydrocarbon chains are used, the nitrogen-linked chain substituent is desirably located in the neighborhood of the center of the chain, but the exact location of this substituent does not appear to be particularly significant.

It is of course to be understood that the foregoing examples are illustrative only and that numerous other compounds and their salts can be prepared which fall within the scope of the appended claims.

This application is a division of our prior application Serial No. 644,212 filed March 6, 1957, now Patent No. 2,950,211.

We claim:
1. A compound of the formula:

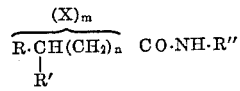

wherein $R \cdot CH(CH_2)_n$ is a hydrocarbon chain derived from a naturally occurring fatty acid of 10 to 20 carbon atoms; R is aliphatic hydrocarbon of 0 to 12 carbon atoms; $n$ is 7 to 9; R' is selected from the group consisting of lower-alkylamino, lower-dialkylamino, lower-alkylamino-lower-alkyleneamino, lower-dialkylamino-lower alkyleneamino, 2 alkyl-1,2-imidazolinyl, 2 alkenyl-1,2-imidazolinyl, N-1(2-alkyl-2-imidazolinyl) lower-alkyleneamino, and N-1(2 alkenyl-2-imidazolinyl) lower-alkyleneamino; R'' is selected from the group consisting of 2 alkyl-2-imidazolinyl-lower alkylene and 2-alkenyl-2-imidazolinyl-lower alkylene, the 2-alkyl and 2-alkenyl groups being of 17 carbon atoms; X is chlorine connected to a carbon atom of said hydrocarbon chain; and $m$ is an integer of zero up to that derived from halogenation of unsaturated fatty acids at the unsaturated bonds.

2. Alpha-N-(1-(2-heptadecenyl-2-imidazolinyl)) ethylamino-N-2-(1-(2 - heptadecenyl - 2 - imidazolinyl)) ethyl acetamide.

3. 9-2(1-(2-heptadecenyl-2-imidazolinyl)) ethylamino-N-2-(1-(2-heptadecenyl-2-imidazolinyl)) ethyl-10-chloro stearamide.

4. 9-dimethylamino-N-2-(1-(2-heptadecenyl - 2 - imidazolinyl)) ethyl-10-chlorostearamide.

References Cited in the file of this patent
UNITED STATES PATENTS

| | | |
|---|---|---|
| 2,473,577 | De Groote et al. | June 22, 1949 |
| 2,713,582 | Smith | July 19, 1955 |
| 2,713,583 | Smith | July 19, 1955 |
| 2,819,284 | Shen | Jan. 7, 1958 |
| 2,914,427 | Valko | Nov. 24, 1959 |